(12) United States Patent
Slongo et al.

(10) Patent No.: US 9,284,733 B2
(45) Date of Patent: Mar. 15, 2016

(54) SEALING MEMBRANE WITH BARRIER AGAINST PLASTICIZER MIGRATION

(75) Inventors: Mario Slongo, Tafers (CH); Carine Kerber, Sarnen (CH); Hagen Aust, Lohmar (DE)

(73) Assignee: SIKA TECHNOLOGY AG, Baar (CH)

( * ) Notice: Subject to any disclaimer, the term of this patent is extended or adjusted under 35 U.S.C. 154(b) by 532 days.

(21) Appl. No.: 13/513,043

(22) PCT Filed: Nov. 26, 2010

(86) PCT No.: PCT/EP2010/068266
§ 371 (c)(1),
(2), (4) Date: May 31, 2012

(87) PCT Pub. No.: WO2011/067167
PCT Pub. Date: Jun. 9, 2011

(65) Prior Publication Data
US 2013/0052386 A1 Feb. 28, 2013

(30) Foreign Application Priority Data
Dec. 1, 2009 (EP) ..................... 09177569

(51) Int. Cl.
*B32B 27/08* (2006.01)
*B32B 27/36* (2006.01)
*B32B 27/30* (2006.01)
(Continued)

(52) U.S. Cl.
CPC ... *E04D 5/10* (2013.01); *B32B 7/12* (2013.01); *B32B 15/08* (2013.01); *B32B 27/30* (2013.01); *B32B 27/36* (2013.01); *E04D 5/148* (2013.01); *Y10T 428/14* (2015.01); *Y10T 428/266* (2015.01); *Y10T 428/2804* (2015.01);
(Continued)

(58) Field of Classification Search
CPC .......... B32B 7/12; B32B 15/08; B32B 27/30; B32B 27/36; E04D 5/10; E04D 5/148; Y10T 428/2804; Y10T 428/2848; Y10T 428/2813; Y10T 428/266; Y10T 428/2891; Y10T 428/14
See application file for complete search history.

(56) References Cited

U.S. PATENT DOCUMENTS 5,316,848 A 5/1994 Bartlett et al.
5,496,615 A 3/1996 Bartlett et al.
(Continued)

FOREIGN PATENT DOCUMENTS

EP 0 764 748 A1 3/1997
EP 0 976 543 A1 2/2000
(Continued)

OTHER PUBLICATIONS

International Search Report issued in International Patent Application No. PCT/EP2010/068266 dated Feb. 11, 2011 (with translation).
(Continued)

*Primary Examiner* — Patricia L Nordmeyer
(74) *Attorney, Agent, or Firm* — Oliff PLC

(57) ABSTRACT

A sealing web including the following layer structure: a) a film containing polyvinyl chloride; b) a first adhesive; c) a polyethylene terephthalate film; and d) a second adhesive; wherein the layers are disposed in the sequence a), b), c), and d). The sealing web makes it possible to implement adhesion of a PVC web over a large area, without problems arising from the migration of the plasticizer from the PVC film to the adhesive, or in that said problems are at least greatly reduced.

13 Claims, 3 Drawing Sheets

(51) Int. Cl.
  *B32B 38/10* (2006.01)
  *C09J 7/02* (2006.01)
  *E04D 5/10* (2006.01)
  *B32B 7/12* (2006.01)
  *B32B 15/08* (2006.01)
  *E04D 5/14* (2006.01)

(52) U.S. Cl.
  CPC ...... *Y10T 428/2813* (2015.01); *Y10T 428/2848* (2015.01); *Y10T 428/2891* (2015.01)

(56) References Cited

U.S. PATENT DOCUMENTS

| | | | |
|---|---|---|---|
| 2003/0190485 A1* | 10/2003 | Takatsuki et al. | 428/458 |
| 2003/0215594 A1 | 11/2003 | Hamdar et al. | |
| 2004/0157074 A1 | 8/2004 | Hubbard | |
| 2004/0244315 A1 | 12/2004 | Rust et al. | |
| 2005/0037217 A1 | 2/2005 | Levin et al. | |
| 2005/0074606 A1* | 4/2005 | Nishiyama et al. | 428/354 |
| 2007/0224414 A1 | 9/2007 | Leonard et al. | |

FOREIGN PATENT DOCUMENTS

| | | |
|---|---|---|
| EP | 1712690 A2 | 10/2006 |
| FR | 2 800 766 A1 | 5/2001 |
| GB | 2 038 710 A | 7/1980 |
| JP | A-S54-96759 | 7/1979 |
| JP | A-11-042731 | 2/1999 |
| JP | A-2002-120313 | 4/2005 |
| RU | 2006 112 352 A | 11/2007 |
| WO | WO 00/43608 A1 | 7/2000 |
| WO | WO 2006/084355 A1 | 8/2006 |

OTHER PUBLICATIONS

Sep. 30, 2014 Office Action issued in Japanese Patent Application No. 2012-541416 (with English translation).
Aug. 21, 2014 Office Action issued in Russian Patent Application No. 2012119712/05 (029627) (with English translation).

* cited by examiner

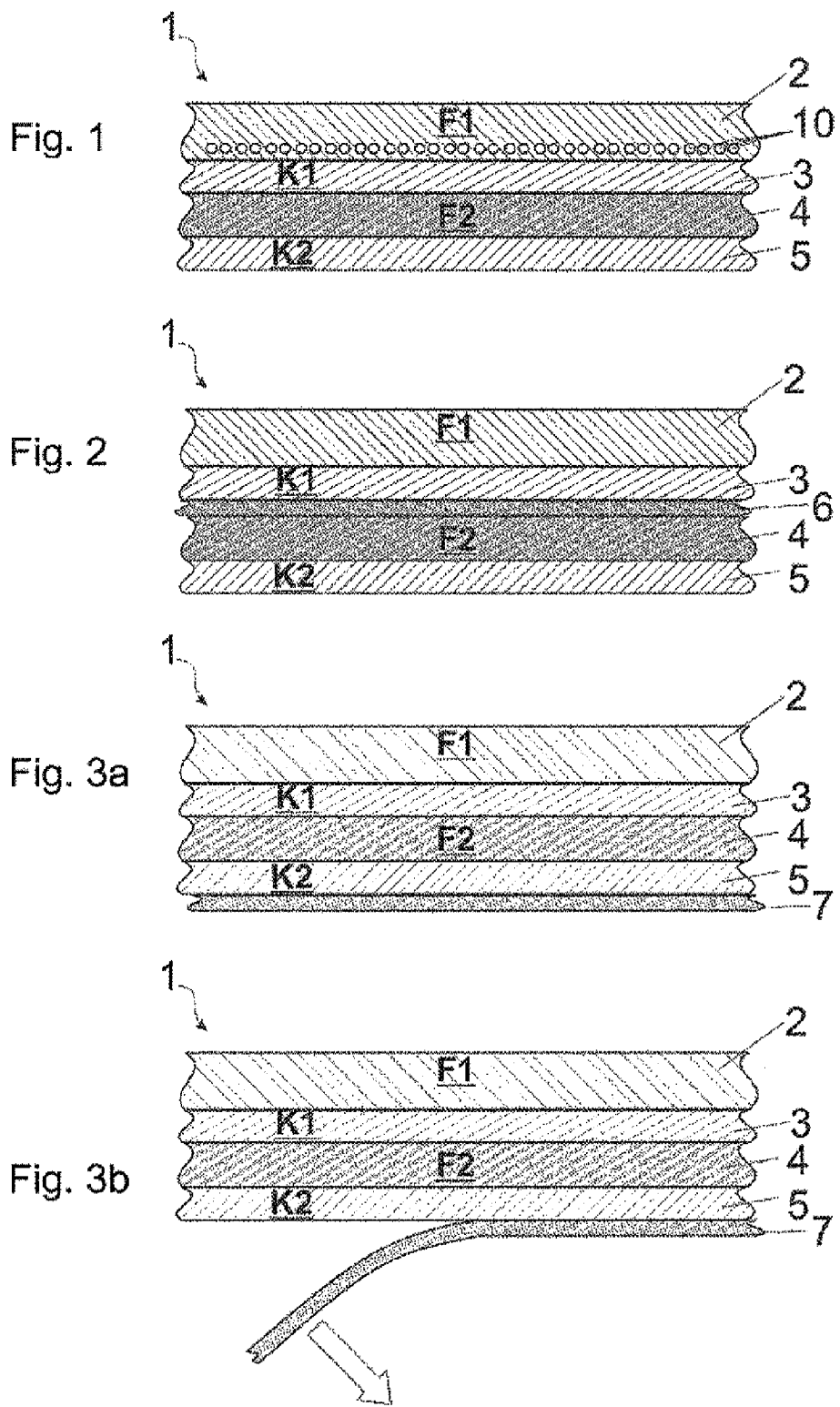

SEALING MEMBRANE WITH BARRIER AGAINST PLASTICIZER MIGRATION

TECHNICAL AREA

The invention relates to the area of PVC sealing membranes, in particular for roof construction.

STATE OF THE ART

PVC sealing membranes have long been known. They have also long been used for the sealing of roofs and of roof structures. Traditionally, the membranes are laid on the roof and welded to each other. Previously, primarily mechanical anchorings, e.g., nails, were used for fastening such membranes. The ensuring of tightness is naturally a great problem here.

PVC sealing membranes contain a large amount of plasticizer in order to ensure a flexibility of the sealing membrane even over a long time period.

However, an adhering of such PVC sealing membranes to the base was not successfully carried out in the past in practice since it turned out that the adhesive required for such an adhering takes up plasticizers from the PVC sealing membrane, as a result of which the adhesive is heavily negatively influenced in its mechanics and in other technical properties, in particular even the adhesion, within a short time so that the adhesive bond is lost within a very short time.

This change is not acceptable for ensuring a long-term roof adhesion.

PRESENTATION OF THE INVENTION

The task of the present invention is therefore to make available a PVC sealing membrane and a method for the sealing that at least greatly reduces if not entirely eliminates the take-up of plasticizers by the adhesive from the PVC film.

It was surprisingly found that a sealing membrane in accordance with Claim 1 can solve this task. In particular, it allows this film to achieve a long-desired wish in a simple manner, namely, to achieve a long-term adhering of a PVC membrane over its entire surface to a substrate, in particular to a roof or a roof structure and to achieve an optimal seal in this manner. It was surprisingly found that a layer of PET has a very efficient barrier effect against plasticizers such as they are customarily used in PVC, in particular plasticized PVC.

The sealing membranes disclosed in this document can be readily produced, are capable of being stored and transported over rather long time periods and can be laid and adhered in an extremely simple manner. In particular, no mechanical fastening means such as nails or the like are required for the laying and fixing. This reduces the susceptibility of films to being damaged. As a consequence, sources of porosity are massively reduced.

WAYS OF CARRYING OUT THE INVENTION

The present invention concerns in a first aspect a sealing membrane. This sealing membrane has the following layer structure:
a) a film (F1) containing a polyvinyl chloride;
b) a first adhesive (K1);
c) a polyethylene phthalate film (F2);
d) a second adhesive (K2).

These layers are arranged in the sequence a), b), c) and d).

The term "film" denotes in this document in particular flexible, planar plastics with a thickness of 0.05 millimeter to 5 millimeters that can be rolled up. Thus, in addition to films in the strict sense of thicknesses below 1 mm, even and preferably sealing membranes are typically used for the sealing of tunnels, roofs or swimming pools in a thickness of typically 1 to 3 mm, in special instances even in a thickness up to a maximum of 5 mm are understood. Such films are usually produced by painting, pouring, calendering or extrusion and are typically commercially available or are produced on site. They can be built up in a single layer or in multilayers. It is clear to the person skilled in the art that even films can also contain other additives and processing agents such as fillers, UV stabilizers and heat stabilizers, plasticizers, lubricants, biocides, flame-retardant agents, antioxidants, pigments such as, e.g., titanium dioxide or carbon black, and colorants. That is, in this document even such films as PVC films, plasticized PVC films and polyethylene terephthalate film are designated that do not consist 100% of PVC or plasticized PVC or PET.

The film (F1) containing polyvinylchloride, also called simply PVC film for short in the following, is in particular a PVC film customary for the area of sealing buildings, in particular a plasticized PVC film. Such PVC films contain in particular plasticizers, typically phthalate plasticizers. Especially suited PVC films are those of Sila Sarnafil AG, Switzerland, the offered products Sikaplan®-12, Sikaplan®-15G, Trocal® 12, Trocal® 15 SG as well as products sold under the product line Sarnafil® G410 and Sarnafil® S327.

The polyethylene terephthalate film (F2), also called simply PET film for short in the following, is based on polyethylene terephthalate (PET). Such PET films are customary, for example, in the packaging industry. It is preferred that their thickness is at least 3 micrometers. If the thickness is less than 3 micrometers the migration barrier effect for plasticizers is insufficient. It turned out that the polyethylene terephthalate film optimally has a thickness of 5 to 50 micrometers, preferably 10 to 40 micrometers. The PET film preferably has few, preferably no plasticizer.

It was determined that the PET film has an excellent barrier action against plasticizers.

In order to increase the barrier action even further, a layer of aluminum can also be used in addition to the PET film, namely, in such a manner that a layer b') of aluminum (F3), in particular in the form of a vapor deposition is arranged between the layer b) of the first adhesive (K1) and the layer c) of the polyethylene terephthalate film (F2). The layer thickness of the aluminum layer is preferably thinner than 20 micrometers, preferably between 1 and 15 micrometers. In addition, when using such an aluminum layer the thickness of the PET film (F2) can be reduced. It is especially suitable in these instances if the thickness of the PET film (F2) is at least 0.5 micrometers, especially between 1 micrometer and 50 micrometers. The aluminum layer can be applied on the PET film, for example, by vacuum coating techniques or be applied on an aluminum film by fusing on or burning on the PET film.

The PVC film (F1) is in contact with a first adhesive (K1). This adhesive brings about a good bond of the PVC film with the polyethylene terephthalate film (F2). In particular, adhesives based on (meth)acrylates proved themselves as such a first adhesive. It proved to be especially advantageous if this adhesive can be activated by heat. Furthermore, it is advantageous for the construction of the sealing membrane if the first adhesive contains little, preferably no plasticizer. In addition, the adhesive action of the adhesive should not be negatively influenced by plasticizers from the PVC film standing in contact.

It is especially preferred in the production of the sealing membrane if the PVC film or the PET film, preferably the PET film, is coated with the first adhesive (K1). Upon the contacting of the PET film and the PVC film a reliable bond is achieved via the intermediately located first adhesive. This contacting preferably takes place at elevated temperature. If an adhesive that can be activated by heat is used as the first adhesive (K1), the temperature upon the contacting is selected to be in particular above the activation temperature of the adhesive so that the adhesive hardens immediately after the contacting and as a result the adhesive bond takes place immediately. The two films are preferably guided and pressed together by rollers, in particular heated rollers, for the contacting.

Such a produced composite film (PVC/adhesive/PET, or PVC/adhesive/Al/PET) is subsequently coated with a second adhesive (K2) on the PET outer side.

The second adhesive (K2) is preferably a contact-bonding adhesive, in particular a contact-bonding adhesive on the basis of a thermoplastic rubber, preferably on the basis of an SBS-/SIS barrier copolymer (SBS=styrene/butadiene/styrene barrier copolymer, SIS=styrene/isoprene/styrene barrier copolymer). Further possibilities for contact-bonding adhesives, even though not preferred, are contact-bonding adhesives on the basis of butyl rubber, bitumen, polymer-modified bitumen.

Other suitable contact-bonding adhesives are polyurethane contact-bonding adhesives.

The contact-bonding adhesive typically comprises a tackifying resin that makes it possible for the contact-bonding adhesive to adhere to a substrate.

The fact that the second adhesive (K2) is already a component of the sealing film is a great advantage during the laying because the sealing film can be readily laid like an adhesive band without the layer having to apply adhesive and making mistakes during the mixing or application of the adhesive.

In order to optimize the mechanics of the sealing membrane it is advantageous if the sealing membrane is reinforced by fibers. It is particularly advantageous if the PVC film (F1) is reinforced by fibers. The reinforcing by fibers can take place in the form of loose fibers or, preferably, by planar fibrous structures. The reinforcing by fibers preferably takes place in such a manner that the PVC film is reinforced with a fiber mat, a fiber-woven fabric or a fibrous tissue. Suitable fibers are in particular glass fibers or polyester fibers.

In order to make the sealing membrane capable of being stored and transported, it is preferred that the layer of the second adhesive (K2) makes contact with a separating film (F4) on the side set opposite the polyethylene terephthalate film (F2). As a result, the adhesive contact-bonding adhesive is protected from erroneous adherings. The sealing membrane can now be rolled up without the individual layers of such a roll adhering to each other. If needed, the separating film can be removed from the sealing membrane so that the sealing membrane can be adhered by the exposed adhesive to a substrate. In particular, the separating film is preferably removed during the adhering process. Suitable separating films are in particular siliconized papers or silicon-based polymer films that have only a slight adhesion to the second adhesive (K2) on account of their chemical structure and can be readily removed again without adhesive remaining adhered to them.

In another aspect the present invention relates to a composite body that consists of a previously described sealing film as well as to a substrate (S1) adhered to it via the second adhesive (K2) of the sealing film.

Basically, any suitable material can serve as substrate (S1). Particularly suitable substrates (S1) are construction materials such as concrete, gypsum, stone, brick, mortar, asbestos cement and natural stones such as granite or marble; metals or alloys such as aluminum, steel, nonferrous metals, galvanized metals; wood, insulating foams, polyisocyanurate resins (PIR); coated substrates such as coated metals or alloys; and paints and varnishes. Materials such as those used for roof substrate are particularly preferred.

The substrates can be pre-treated as needed prior to the application of the adhesive or of the sealant. Such pre-treatments comprise in particular physical and/or chemical cleaning processes, for example, grinding, sandblasting, brushing or the like or treatment with cleaners or solvents or the application of an adhesion promoter, an adhesion promoter solution or of a primer.

However, the adhering preferably takes place without primer.

Since the sealing film is preferably used to seal roof structures, the composite body is preferably a sealed roof.

In another aspect the present invention relates to a method for sealing a substrate (S1). This method comprises either the steps:

α) Removal of the separating film (F4) of a previously described sealing membrane;

β) Contacting of the second adhesive (K2) of the sealing membrane with the substrate (S1) to be sealed;

or the steps:

α') Making a previously described sealing membrane available;

β) Contacting the second adhesive (K2) of the sealing membrane with the substrate (S1) to be sealed.

Prior to the step β) of the contacting the sealing membrane can be brought into the position to be adhered. The adhering preferably takes place by rolling the sealing membrane onto the substrate (S1) to be adhered. In order to achieve a planar seal, it is preferred in the case of large areas that the edge areas of the individual sealing membranes overlap each other. In order even in these instances to achieve the best possible seal, the best possible bond between the overlapping sealing membranes is necessary. This is achieved in particular in that no second adhesive (K2) is present on the edge area of the upper overlapping sealing membrane but rather that the PVC film of the overlapping (i.e.) upper sealing membrane lies preferably in direct contact with the PVC film of the overlapped (i.e., lower) sealing membrane, and that these two PVC layers are subsequently connected to one another by a suitable adhesive or, preferably, tightly welded to one another by a welding device. It is advantageous for this use if a sealing membrane is designed in such a manner that one of the longitudinal sides and optionally one of the wide sides of the sealing membrane has a PVC film projecting over the edge on the edge area so that no second adhesive (K2) is present there.

Thus, it is preferred that the sealing membrane has a projecting PVC strip in the edge area of the sealing membrane, especially on the longitudinal side. It is furthermore preferred that no second adhesive (K2) is present on this projecting PVC strip.

Alternatively, it is also possible that two sealing membranes are laid adjacent to one another in such a manner that they contact one another on the front side or only have a narrow intermediate space (typically less than 1 cm). The gap between the individual sealing membranes can be covered, for example, by a PVC film laid over this gap and be connected to the PVC surface of the sealing membranes in accordance with the invention by a suitable adhesive or, preferably, they can be tightly connected to each other by a welding device.

It is of course also possible to combine these two just-described methods with one another. Thus, it is especially appropriate to manufacture the sealing membrane in such a manner that it has a projecting PVC strip on the longitudinal side so that two adjacent membranes can be sealed as described by an overlapping in the manner of shingles and by welding the projecting PVC flap to the sealing membrane located under it, whereas on the wide side of the sealing membrane a welding, as described above, via a separately placed PVC strip on the sealing membranes sequentially following one another on the front side (optimally contacting one another on the front side) takes place.

Thus, it is preferred in one embodiment that in a step γ) following the step β) a second, previously described, sealing membrane is attached, after the removal of any separating film (F4) present, adjacent to the sealing membrane already applied after step α) or step α') and step β) in that the second adhesive (K2) of the second sealing membrane is contacted to the substrate (S1) to be sealed in such a manner that the projecting PVC strip overlaps with the sealing strip already applied after step α) or step α') and step β) and is connected to its film (F1) containing polyvinylchloride. The connecting takes place here in particular by an adhesive, preferably by a first adhesive (K1) or, most preferably, by welding.

In another embodiment it is therefore preferred that in a step γ) following the step β) a second, previously described sealing membrane is attached, after the removal of any separating film (F4) present, adjacent to the sealing membrane already applied after step α) or step α') and step β) in that the second adhesive (K2) of the second sealing membrane is contacted to the sealing substrate (S1), and they are connected to each other via a PVC strip in a subsequent step ε) onto the polyvinylchloride-containing films (F1) of the sealing membranes lying adjacent to each other so that a gap present in any case between the sealing membranes is sealed. The connection takes place here in particular by an adhesive, preferably by a first adhesive (K1), or, most preferably, by welding.

The sealing film previously described in detail is preferably used to seal a substrate (S1), in particular of a roof These are in particular flat roofs, parking decks or landscaped roofs to be sealed.

Aside from the purpose of use, the previously described sealing membranes are also used in other areas of underground structures and above-ground structures.

The present invention is also therefore especially advantageous because no solvent-based adhesives are required for the adhesion.

A central aspect of the present invention is the use of a polyethylene terephthalate film as plasticizer barrier between a plastic film containing plasticizer and between an adhesive.

SHORT DESCRIPTION OF THE DRAWINGS

The invention is explained in detail in the following using preferred exemplary embodiments with the aid of the figures, whereby it is pointed out that only the elements essential for the direct understanding of the invention are shown. The same elements in the different figures are characterized with the same reference numerals. Furthermore, it is pointed out that the figures shown here are schematic representations with no reference to size,
in which FIG. 1 shows a schematic cross section through a sealing membrane;

FIG. 2 shows a schematic cross section through another embodiment of a sealing membrane;

FIG. 3 schematically shows different steps in the process for sealing a substrate:

FIG. 3a shows a schematic cross section through a sealing membrane with separating film;

FIG. 3b shows a schematic cross section through sealing membrane during the removal of the separating film;

The drawings are schematic. Only the elements essential for the direct understanding of the invention are shown. Directions of movement are indicated with arrows.

FIG. 1 shows a schematic cross section through a sealing membrane 1 with the layer construction:
a) a film (F1) 2 containing polyvinylchloride;
b) a first adhesive (K1) 3;
c) a polyethylene terephthalate film (F2) 4;
d) a second adhesive (K2) 5.

The layers PVC film (F1) 2, first adhesive (K1) 3, PET film (F2) 4 and second adhesive (K2) 5 are arranged from top to bottom in this sequence in the presentation selected here. In the embodiment selected here the PVC film 2 is reinforced with fibers, in particular with a glass fiber tissue 10. The first adhesive (K1) 3, that stands in direct contact with the PVC film (F1) 2 and the PET film (F2) 4, is in particular an adhesive based on (meth)acrylates and that can be activated by heat. The second adhesive (K2) is in particular a contact-bonding adhesive, especially a contact-bonding adhesive based on a thermoplastic rubber, preferably on the basis of an SBS-/SIS barrier copolymer, and is applied on the site of the PET film (F2) 4 placed opposite the PVC film. Such a sealing membrane has an excellent barrier function against plasticizers stemming from the PVC film (F1) 2 and prevents these plasticizers from migrating into the second adhesive (K2) 5.

FIG. 2 shows a schematic cross section through another embodiment of a sealing membrane 1. It shows the same layer construction as was described above in FIG. 1 with the exception that a layer b') of aluminum (F3) 6 is arranged between the layer b) of the first adhesive (K1) 3 and the layer c) of the polyethylene terephthalate film (F2). Such a sealing membrane has an even greater barrier action against plasticizers.

Figure 3C:
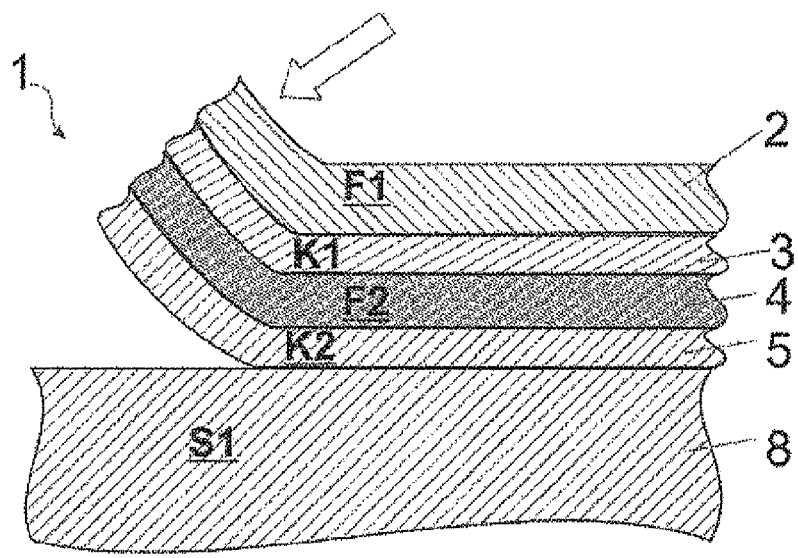
FIG. 3c shows a schematic cross section through sealing membrane during the contacting of the sealing membrane with the substrate to be adhered.
Figure 3D:
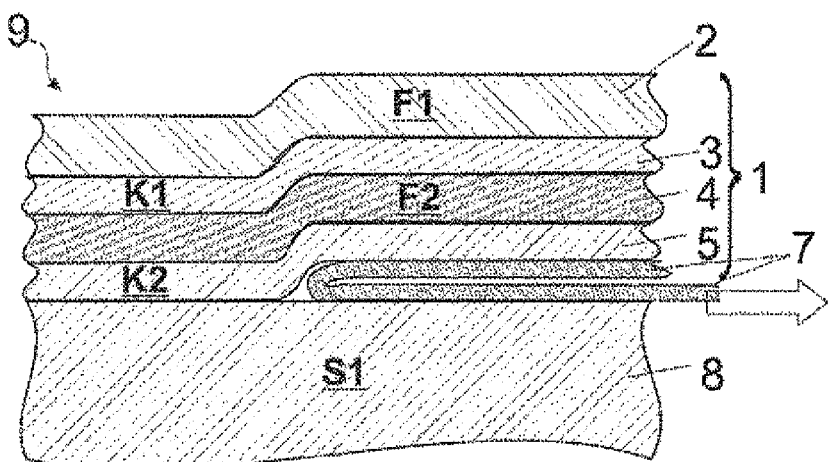
FIG. 3d shows a schematic cross section through sealing membrane upon the contacting of the sealing membrane with the substrate to be adhered in an adhering process alternative to FIG. 3b and FIG. 3c.

FIG. 3, consisting of the FIGS. 3a, 3b, 3c and 3d, schematically shows the different steps in the method for sealing a substrate:

FIG. 3a shows a schematic cross section through a sealing membrane 1 with the layers PVC film (F1) 2, first adhesive (K1) 3, PET film (F2) 4 and second adhesive (K2) 5. In addition, the layer of the second adhesive (K2) 5 is in contact with a separating film (F4) 7 on the site placed opposite the polyethylene terephthalate film (F2) 4. The contact-bonding selected as the second adhesive (K2) is thus completely covered by the separating film so that the sealing membrane can be grasped, stored, transported and in particular rolled without adhering.

FIG. 3b shows a schematic cross section through the sealing membrane 1 as it is described in FIG. 3a during the removal of the separating film (F4) 7.

FIG. 3c shows a schematic cross section. Here, the sealing membrane 1 is applied on the substrate (S1) 8 after the separating film (F4) 7 had been removed, as shown in FIG. 3b, in that the second adhesive (K2) 5 of the sealing membrane 1 is put in contact with the substrate (S1) 8 to be sealed.

FIG. 3d schematically shows the formation of a composite 9. The sealing membrane 1 is placed, with the separating film (F4) 7 still applied, onto the substrate (S1) 8 to be sealed, cut to form and placed in the proper position. The one end of the sealing membrane 1 is now raised and the separating film 7 drawn off in this area and the sealing membrane is now brought in contact with the substrate (S1) 8 to be sealed via the now-exposed adhesive (K2) 5 and is adhered. The separating film is now drawn off continuously between the sealing film 1 and the substrate 8 to be sealed so that immediately after the drawing off (removal) of the separating film 7 the second adhesive (K2) 5 of the sealing membrane 1 is brought in contact with the substrate to be sealed and they are adhered to one another. This type of adhering is especially preferred for large-area adherings since accurately fitting adherings and sealings can be more readily achieved in this manner.

Figure 3E:
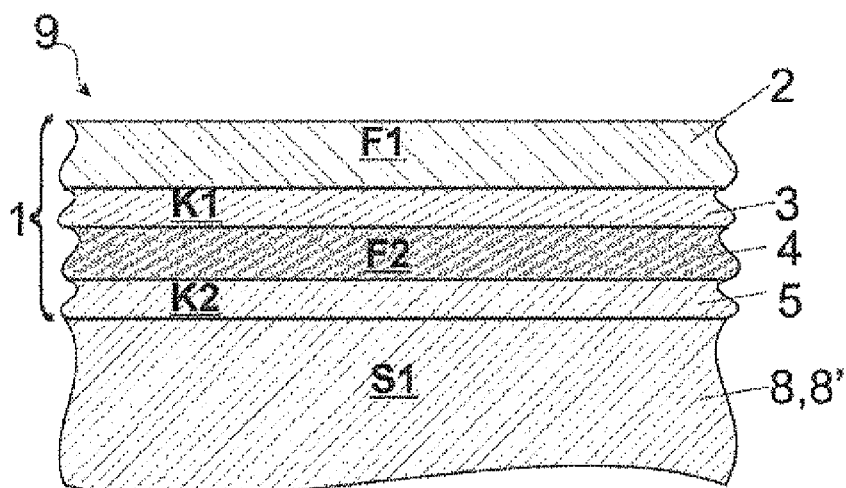
FIG. 3e shows a schematic cross section through a formed composite body.

FIG. 3e shows a schematic cross section through the composite body 9 resulting as the result of the method shown by FIGS. 3a, 3b, 3c and 3d for sealing a substrate. The composite body 9 therefore consists of a sealing film 1 as well as a substrate (S1) 8 adhered to it via the second adhesive (K2) 5 of the sealing film 1. Such a composite body 9 is in particular a sealed roof since in particular a roof 8' is preferred as the substrate (S1) 8 to be sealed.

Figure 4:
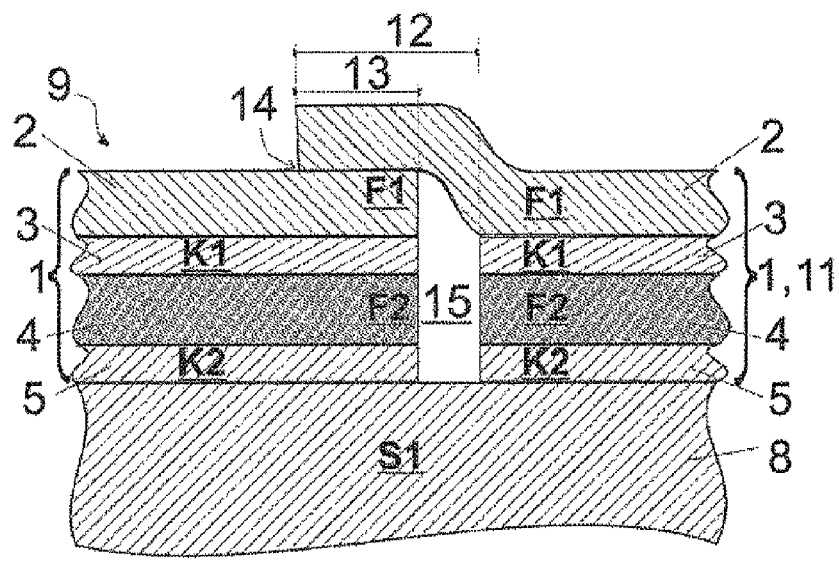
FIG. 4 shows a schematic cross section through a composite body with two overlapping sealing membranes.

FIG. 4 shows a schematic cross section through the composite body with two overlapping sealing membranes. In the left area of the figure the end of a sealing membrane 1 is shown adhered, as shown in FIG. 3e. In order to ensure a seal even in the overlapping area 12, the overlapping sealing film 11 is shaped in such a manner in the edge area 12 in the embodiment shown here that no second adhesive (K2) 5 is present there, but rather the PVC film of the overlapping (i.e., upper) sealing membrane 11 is preferably in direct contact with the PVC film of the overlapped (i.e., lower) sealing membrane 1, and subsequently these two PVC layers are tightly welded to one another in the overlapping area 13 by a welding device. The welding 14 has the consequence that the two overlapping sealing membranes ensure an unobjectionable seal and in particular it is prevented the water passes from the outside into the gap 15 between the sealing membranes 1, 11 and therefore to the substrate (S1) 8 to be sealed.

Figure 5:
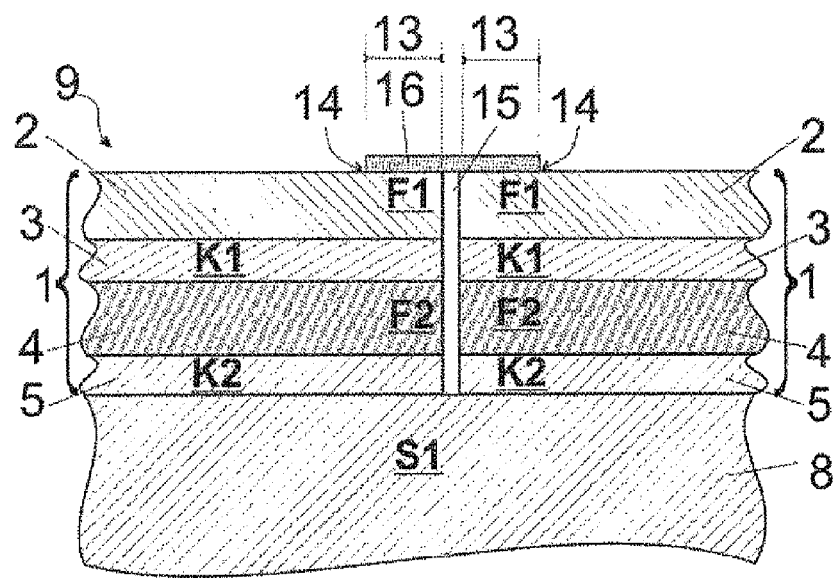
FIG. 5 shows a schematic cross section through a composite body with two sealed sealing membranes.

FIG. 5 shows a schematic cross section through a composite body 9 with two sealed sealing membranes. This possibility shown here is a variant of the possibility, shown in FIG. 4, of the sealing in the edge area of sealing membranes. Here, two sealing membranes 1 are positioned adjacent to one another and adhered in such a manner that no or only a very small gap 15 is produced between the sealing membranes 1. This gap 15 on the front side is sealed by a PVC film strip 16 in that this PVC film strip 16 is placed over the gap 15 and they are sealed tight to each other by a welding device.

EXAMPLES

The following examples serve to illustrate the present invention.

The following sealing membranes were produced as follows:

Ref.:

Sarnafil® G410-15 EL, a PVC sealing film (thickness 1.5 mm, reinforced with a glass mat) commercially available from Sika Sarnafil AG, Switzerland was coated on one side with SikaMelt®-9209HT, a contact-bonding adhesive, commercially available from Sika Automotive GmbH, Germany, in an amount of 150 g/m². Then, a siliconized paper was placed as separating film on the coated contact-bonding adhesive in order to prevent an erroneous adhering. This sealing membrane serves for reference purposes and is designed as Ref. in the following.

1:

Sarnafil® G410-15 EL, a PVC sealing film (thickness 1.5 mm, reinforced with a glass mat) commercially available from Sika Sarnafil AG, Switzerland was joined at 150-165° C. to a 30 micrometer thick PET film coated on one side with heat-activatable methacrylate adhesive and they were pressed by two rollers and adhered to each other. The orientation of the PET film coated with adhesive was such that the side coated with adhesive came in contact with the PVC film. Conditioned by the heat activation of the adhesive, a good adhesive bond was present between the two films immediately upon their leaving the pressure rollers.

The surface of the composite film PVC/adhesive/PET produced in this manner was coated on one side on the PET side with SikaMelt® 9209HT, a contact-bonding adhesive, commercially available from Sika Automotive GmbH, Germany, in an amount of 150 g/m². Then, a siliconized paper was placed as separating film on the coated contact-bonding adhesive in order to prevent an erroneous adhering. This sealing membrane is designated in the following as 1.

2:

A PET film 12 micrometers thick and vapor-deposited on one side with aluminum was coated on the aluminum side with heat-activatable methacrylate adhesive. This Al/PET film coated with adhesive was joined by a doubling apparatus at 150-170° C. to Sarnafil® G410-15, a PVC sealing film (thickness 1.5 mm, reinforced with a glass mat) commercially available from Sika Sarnafil AG, Switzerland and they were adhered to one another. Here, the Al/PET film and the PVC sealing film are each heated via a vapor bath heating cylinder and thereafter pressed between two pressure rollers and adhered to one another. The orientation of the PET film coated with adhesive was such that the side coated with adhesive came in contact with the PVC film. Conditioned by the heat activation of the adhesive, a good adhesive bond was present between the two films immediately upon their leaving the pressure rollers.

The surface of the composite film PVC/adhesive/Al/PET produced in this manner was coated on one side on the PET side with SikaMelt®-9209HT, a contact-bonding adhesive, commercially available from Sika Automotive GmbH, Germany, in an amount of 150 g/m². Then, a siliconized paper was placed as separating film on the coated contact-bonding adhesive in order to prevent an erroneous adhering. This sealing membrane is designated in the following as 2.

Testing

For the testing this sealing membranes were cut with a cutter in strips with the dimensions 5 cm×20 cm (for zinc sheeting) and 5 cm×25 cm (for Duraguard), the separating films of the sealing membranes removed and 4 such strips were adhered adjacent to each other on a zinc sheeting 0.6 mm thick (surface electrolytically galvanized) with the dimensions 20 cm×25 cm and onto a Dens Deck Duraguard plate 8.5 mm thick of the Georgia-Pacific Building Products company, USA (glass-mat-modified gypsum plate) with the dimensions 25 cm×25 cm, and pressed with a 5 kg pressure roller and conditioned 7 days at 23° C./50% rel. air humidity.

These composite bodies formed in this manner were stored during a storage time of a total of 4 weeks at 23° C./50% rel. air humidity ("RT") in a forced-air oven at 50° C. ("50° C.")

and at 70° C. ("70° C.") and the peel resistance tested after 1, 2, 3 and 4 weeks. One of the four strips was tested each week.

The peel resistance ("SF") was measured according to EN 1372 and the measured values are indicated in table 1 and table 2 as SF (N/50 mm). The tear-off angle was not selected for the zinc sheeting at 90° but at 30° because it turned out that at a tear-off angle of 90° the Duraguard plates were destroyed.

TABLE 1

Results of the peel strengths on zinc sheeting after different storages.

| Substrate = Zinc sheeting Storage temperature | Storage time | Ref. SF [N/ 50 mm] | 1 SF [N/ 50 mm] | 2 SF [N/ 50 mm] |
| --- | --- | --- | --- | --- |
| RT | 1 Week | <10 | 20 | 28 |
| RT | 2 Weeks | <10 | 18 | 26 |
| RT | 3 Weeks | <10 | 17 | 24 |
| RT | 4 Weeks | <10 | 17 | 21 |
| 50° C. | 1 Week | <10 | 22 | 22 |
| 50° C. | 2 Weeks | <10 | 22 | 22 |
| 50° C. | 3 Weeks | <10 | 18 | 21 |
| 50° C. | 4 Weeks | <10 | 17 | 20 |
| 70° C. | 1 Week | n.m.[1] | 25 | 26 |
| 70° C. | 2 Weeks | n.m.[1] | 24 | 26 |
| 70° C. | 3 Weeks | n.m.[1] | 22 | 26 |
| 70° C. | 4 Weeks | n.m.[1] | 21 | 23 |

[1]n.m. = not measurable: The specimens were no longer able to be measured because the adhesive liquefied during the storage in such a manner that the specimen body already loosened in vertical storage.

TABLE 2

Results of the peel strengths on Dens Deck Duraguard after different storages.

| Substrate = Dens Deck Duraguard Storage temperature | Storage time | Ref. SF [N/ 50 mm] | 1 SF [N/ 50 mm] | 2 SF [N/ 50 mm] |
| --- | --- | --- | --- | --- |
| RT | 1 Week | 15 | 30 | 28 |
| RT | 2 Weeks | 14 | 20 | 26 |
| RT | 3 Weeks | 12 | 18 | 25 |
| RT | 4 Weeks | 11 | 15 | 25 |
| 50° C. | 1 Week | <10 | 20 | 29 |
| 50° C. | 2 Weeks | n.m.[1] | 20 | 27 |
| 50° C. | 3 Weeks | n.m.[1] | 18 | 26 |
| 50° C. | 4 Weeks | n.m.[1] | 14 | 25 |
| 70° C. | 1 Week | n.m.[1] | 14 | 23 |
| 70° C. | 2 Weeks | n.m.[1] | n.m.[2] | 22 |
| 70° C. | 3 Weeks | n.m.[1] | n.m.[2] | 20 |
| 70° C. | 4 Weeks | n.m.[1] | n.m.[2] | 19 |

[1]n.m. = not measurable: The specimens were no longer able to be measured because the adhesive liquefied during the storage in such a manner that the specimen body already loosened in vertical storage.
[2]n.m. = not measurable. The strips bent greatly.

It can be seen from the results of tables 1 and 2 that the drops in the adhesive strengths caused by the plasticizer migration after extended storage, in particular after storage at elevated temperature in the examples 1 and 2 in accordance with the invention were able to be greatly reduced in comparison to the reference example Ref. The improvement in the sealing membrane of example 2, that also additionally comprises aluminum as barrier layer in addition to PET is especially pronounced. Examples 1 and 2 are distinguished in particular by a greatly elevated thermal stability (50° C.) in comparison to the reference example Ref. 1. Example 2 was extremely resistant to the influence of plasticizers.

LIST OF REFERENCE NUMERALS 1 sealing membrane
2 film (F1) containing polyvinylchloride
3 first adhesive (K1)
4 polyethylene terephthalate film (F2)
5 second adhesive (K2)
6 aluminum (F3)
7 separating film (F4)
8 substrate (S1)
8' roof
9 composite body
10 fibers, fibrous tissue
11 overlapping sealing membrane 1
12 edge area of the sealing membrane 11
13 overlapping area
14 welding
15 Sealed gap between the sealing membranes
16 PVC film strip

The invention claimed is:
1. A sealing membrane comprising the following layer structure:
   a) a film containing polyvinyl chloride;
   b) a first heat-activated adhesive based on (meth)acrylates;
   c) a polyethylene terephthalate film; and
   d) a second adhesive,
   wherein the layers are arranged in the sequence a), b), c) and d).
2. The sealing membrane according claim 1, wherein the second adhesive is a contact adhesive.
3. The sealing membrane according to claim 1, wherein the polyethylene terephthalate film has a thickness in the range of 5 to 50 micrometers.
4. The sealing membrane according to claim 1, wherein a layer b') made of aluminum is arranged between the layer b) of the first heat-activated adhesive and the layer c) of the polyethylene terephthalate film.
5. The sealing membrane according to claim 1, wherein the sealing membrane is reinforced by fibers.
6. The sealing membrane according to claim 1, wherein the sealing membrane has a projecting PVC strip in an edge area of the sealing membrane.
7. The sealing membrane according to claim 6, wherein no second adhesive is present on the projecting PVC strip.
8. The sealing membrane according to claim 1, wherein the layer of the second adhesive is in contact with a separating film on a side opposite to the side of the polyethylene terephthalate film.
9. A composite body comprising:
   the sealing membrane according to claim 1; and
   a substrate glued to the sealing membrane by means of the second adhesive of the sealing membrane.
10. The composite body according to claim 9, wherein the composite body is a sealed roof.
11. A method for sealing a substrate, the method comprising:
   providing a substrate to be sealed;
   providing a first sealing membrane according to claim 1, the layer of the second adhesive being in contact with a separating film on a side opposite to the side of the polyethylene terephthalate film;
   removing the separating film from the sealing membrane; and
   bringing the second adhesive of the sealing membrane in contact with the substrate to be sealed.
12. The method according to claim 11, further comprising:
   after brining the second adhesive of the first sealing membrane in contact with the substrate to be sealed, providing a second sealing membrane according to claim 1;

applying the second sealing membrane adjacent to the first sealing membrane by bringing the second adhesive of the second sealing membrane in contact with the substrate to be sealed; and sealing a gap between the first sealing membrane and the second sealing membrane by connecting the polyvinyl chloride-containing film of the first sealing membrane and the polyvinyl chloride-containing film of the second sealing membrane to each other by means of a PVC strip.

13. A method of sealing a substrate, the method comprising:

sealing a substrate by applying the sealing membrane according to claim 1.

* * * * *